C. L. FREDERICK.
BELT SHIFTER.
APPLICATION FILED MAR. 27, 1912.
1,046,169.
Patented Dec. 3, 1912.
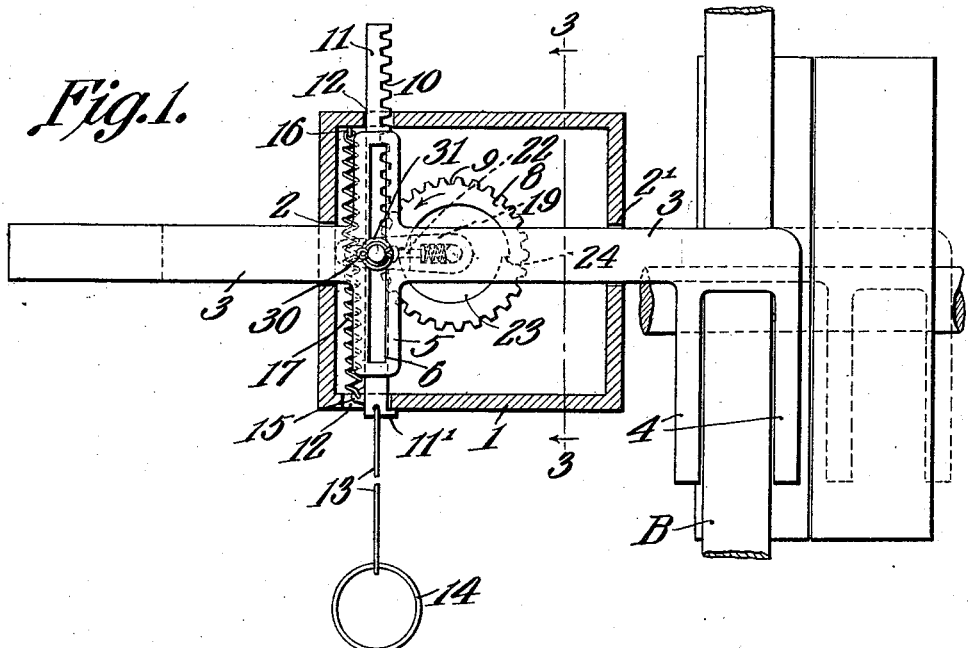
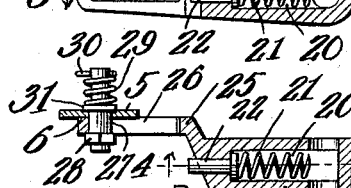
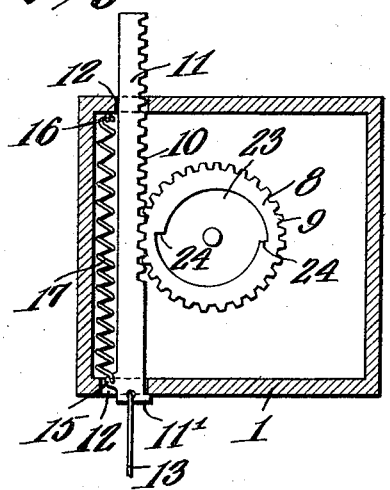
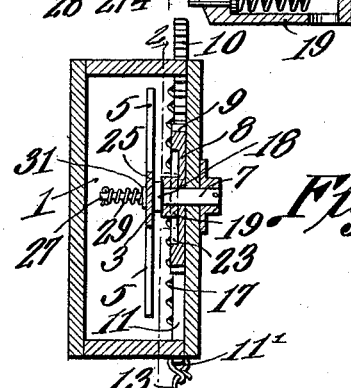
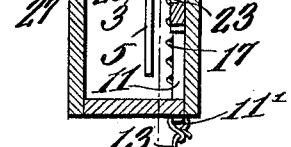
Charles L. Frederick,
Inventor
by C. A. Snow & Co.
Attorneys

UNITED STATES PATENT OFFICE.

CHARLES LEO FREDERICK, OF NORWALK, OHIO.

BELT-SHIFTER.

1,046,169.

Specification of Letters Patent. Patented Dec. 3, 1912.

Application filed March 27, 1912. Serial No. 686,634.

*To all whom it may concern:*

Be it known that I, CHARLES L. FREDERICK, a citizen of the United States, residing at Norwalk, in the county of Huron and State of Ohio, have invented a new and useful Belt-Shifter, of which the following is a specification.

The present invention relates to improvements in belt shifters, the primary object of the invention being the production of a novel form of belt shifting device which when in stationary position properly slides the belt upon the desired fast or loose pulley, and which by a pulling movement will shift the belt to the other pulley and return to normal position for the next operation to shift the belt again to the first pulley.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a top plan view of a fast and loose pulley with the belt thereon showing the shifting device in operable relation thereto, the casing being shown in section, the section being taken through the casing for the actuating mechanism. Fig. 2 is a section taken on line 2—2 of Fig. 3. Fig. 3 is a section taken on line 3—3 of Fig. 1. Fig. 4 is a section taken on line 4—4 of Fig. 5. Fig. 5 is a section taken on line 5—5 of Fig. 4.

Referring to the drawings, the numeral 1 designates the actuating mechanism retaining casing which as shown in Fig. 1 is provided with the oppositely disposed alined apertures 2 and 2′, respectively, for the reception of the belt shifting plate or rod 3, which is provided with the belt shifting fork 4 disposed in operable relation to the belt B, said plate being further provided with the oppositely extending lugs or arms 5, which are provided with the elongated slot 6, said arms being disposed at all times within the casing 1.

A stud 7 is connected to the base of the casing 1 and projects interiorly thereof and has mounted for rotation thereon the disk 8, which is provided with the peripheral teeth 9 which are at all times in engagement with the teeth 10 of the reciprocatory rack bar 11 which is disposed for movement within the alined apertures 12 formed in the opposite walls of the casing 1. By this means it will be seen that any movement of the bar 11 will impart rotation to the gear disk 8, a flexible cord 13 being connected to the lower end of said rack bar and provided with a pulling or finger ring 14, while formed integral with the bar is a lug 15, which with the lug 16 carried interiorly of the casing 1 provides connecting means for the spring 17, which normally holds the rack bar in the position shown in Figs. 1 and 2, the lip 11′ engaging the casing and preventing a further upward movement of said bar. By this construction the downward movement of the rack bar 11, when pulled by the flexible cord 13, will move the gear 8 in the direction of the arrow as indicated in Fig. 1, one half revolution, while when released the spring 17 will return the rack bar 11 and rotate the gear 8 freely one half revolution in an opposite direction and without affecting the lever 19, as will presently appear.

To impart the desired movement to the belt shifting bar or plate 3, the actuating lever 19 therefor is pivoted upon the end of the stud 7 as at 18. The lever 19 is provided with the cavity 20 in which is mounted the spring 21, which actuates the trigger or catch 22 to hold the outer end thereof into engagement with the inner face of the cam rim of the cavity or recess 23 of the gear 8, so that when the bar 11 is pulled downwardly, as viewed in Fig. 1, the gear 8 will be moved in the direction of the arrow causing one shouldered portion or abutment 24 to engage the outer end of the catch 22 and thereby move the lever 19 so that the pin 27 will be moved 180 degrees or in a diametrically opposite position, and impart movement to the shifting bar or plate 3 (dotted lines Fig. 1) through the medium of the pin 27 which is slidably mounted in the slot 6 of the said shift bar 3 and is carried in the slot 26 of the projecting end 25 of the lever 19. Upon the release of the ring 14, the spring 17 will pull the rack bar 11 upwardly and thus rotate the gear 8 freely in a direction opposite to the arrow of Fig. 1, thus rotating the gear 8 one half revolution in a reverse direction so as to place the next succeeding shoulder or abutment 24 in position to again engage the catch 22, the catch 22 being depressed due to the cam edge of the gear and its gradual eccentric shape when being moved toward the next succeeding abutment 24. Thus the gear 8 will be placed in position to actuate the bar 3 in an opposite direction when the rack bar 11 is again pulled downwardly upon.

In order that the throw of the shifting fork 4 may be adjusted for various width belts and pulleys, the said pin 27 is connected at various points in the slot 26 regulating the same relatively to the pivotal point 18, to regulate the throw of the shifting bar 3, the lock nut 28 being employed to retain the parts in the desired position, while the cotter pin 30 and spring 29 mounted upon the pin will yield a slight pressure upon the disk 31 and the shifting bar 3 and retain the parts in the proper operable relation.

From the foregoing description taken in connection with the drawings, it is evident that with a construction as herein set forth, that the adjustment of the pin 27 within the slot 26 will regulate the arc of the operating circle and the consequent throw of the shift bar 3, and that by reason of the construction of the cam recess 23, with the shoulder portion 24 and the spring catch 22 carried by the lever 19, the downward pull upon the rack bar 11 will shift the bar 3 in one direction, while the spring 17 will return the bar 11 without affecting the shift bar, said shift bar having sufficient resistance offered by the belt B to retain it in the desired position with the lever 9 stationary and unaffected when the spring 17 returns the rack bar, so that another pull upon the said rack bar 11 will be necessary to move the shift bar in the opposite direction, thus requiring manual operations for both shifting movements.

What is claimed is:

1. A belt shifter, having a reciprocatory shifting bar, a frame supporting the same, a gear rotatably mounted in the frame and provided with a cam recess having two diametrically opposite shouldered portions, a rack bar slidably mounted in the frame and in operable relation to the gear, a spring for moving the rack bar in one direction, manually controlled means for moving said rack bar in the other direction and in opposition to the spring, a pivoted arm having the same axis as the gear and independent of the gear, a spring actuated pawl carried by said arm in operable relation to the cam recess of the gear, said pawl engaging one shouldered portion of the cam and locking the arm with the gear when the gear is rotated manually in one direction, the gear rotating freely in the opposite direction when returned by the rack due to the spring and the cam is rotated to disengage the pawl, and means for operably connecting the free end of said arm to the shifting bar.

2. A belt shifter, having a reciprocatory shifting bar provided with a transversely disposed slot intermediate of its ends, a frame supporting the same, a gear rotatably mounted in the frame and provided with a cam recess having two diametrically opposite abutments, an oscillatory rack bar mounted in the frame and in operable relation to the gear, a spring for moving the rack bar in one direction, manually controlled means for operating said rack bar in the other direction and in opposition to the spring, a pivoted arm having the same axis as the gear and independent of the gear, a spring actuated pawl carried by said arm and in operable relation to the cam recess of the gear, said pawl locking the arm with the gear when the rack is manually operated and releasing the gear when the rack bar is returned by its spring, the outer free end of said arm being slotted longitudinally, and a pin adjustably mounted in the slot of said arm and slidable in the transverse slot of the shifting bar.

In testimony that I claim the foregoing as my own, I have hereto affixed my signature in the presence of two witnesses.

CHARLES LEO FREDERICK.

Witnesses:
 Ed. M. Thoma,
 Ed. J. Smith.

---

Copies of this patent may be obtained for five cents each, by addressing the "Commissioner of Patents, Washington, D. C."